(12) United States Patent
Park et al.

(10) Patent No.: US 8,011,723 B2
(45) Date of Patent: Sep. 6, 2011

(54) AIRCRAFT SEATING AND SEATING ARRANGEMENTS

(75) Inventors: James Park, London (GB); Kim Chui Sim, Singapore (SG)

(73) Assignee: Singapore Airlines Limited, Singapore (SG)

( * ) Notice: Subject to any disclaimer, the term of this patent is extended or adjusted under 35 U.S.C. 154(b) by 326 days.

(21) Appl. No.: 12/094,575

(22) PCT Filed: Nov. 24, 2005

(86) PCT No.: PCT/SG2005/000401
§ 371 (c)(1),
(2), (4) Date: Sep. 25, 2008

(87) PCT Pub. No.: WO2007/061381
PCT Pub. Date: May 31, 2007

(65) Prior Publication Data
US 2009/0146006 A1    Jun. 11, 2009

(51) Int. Cl.
*B60N 2/32* (2006.01)
(52) U.S. Cl. .......... 297/118; 297/63; 297/112; 297/114; 297/232; 297/283.2; 244/118.6
(58) Field of Classification Search ........... 297/63, 297/112, 114, 118, 232, 243, 378.1; 244/118.6
See application file for complete search history.

(56) References Cited

U.S. PATENT DOCUMENTS

| | | | |
|---|---|---|---|
| 6,692,069 B2 * | 2/2004 | Beroth et al. | 297/118 |
| 7,318,622 B2 * | 1/2008 | Rezag et al. | 297/118 |
| 7,517,010 B2 * | 4/2009 | Saint-Jalmes et al. | 297/118 |
| 7,721,990 B2 * | 5/2010 | Jaeger et al. | 244/118.6 |
| 2001/0003962 A1 * | 6/2001 | Park et al. | 108/140 |
| 2007/0164157 A1 * | 7/2007 | Park | 244/118.6 |
| 2009/0146005 A1 * | 6/2009 | Bettell | 244/118.6 |
| 2010/0025530 A1 * | 2/2010 | Ferry et al. | 244/118.6 |

FOREIGN PATENT DOCUMENTS

| | | |
|---|---|---|
| EP | 0 957 025 A2 | 11/1999 |
| GB | 2 295 962 A | 6/1996 |
| WO | 03/013903 A1 | 2/2003 |

* cited by examiner

*Primary Examiner* — Laurie K Cranmer
(74) *Attorney, Agent, or Firm* — Sughrue Mion, PLLC

(57) ABSTRACT

A seating arrangement for an aircraft cabin is disclosed which includes seats having a backrest (16) which is pivotally moveable from an upright position to a flat position. A side ottoman (22) having a front portion (42) is located beside the seat base (14) of the seat. The seat has a footwell (32) into which the front portion of the side ottoman locates so that when the seat (16) is in the flat position a bed is formed by the rear surface (17), the front portion (42) located in the footwell of a front seat in front of the said seat and a base (34) of an open space (30) behind is the backrest (16) when in an upright position.

16 Claims, 6 Drawing Sheets

AIRCRAFT SEATING AND SEATING ARRANGEMENTS

FIELD OF THE INVENTION

This invention relates to an aircraft seat and seating arrangements, and to an aircraft cabin having the seating arrangements.

BACKGROUND OF THE INVENTION

International application no. PCT/SG2005/000041 discloses an aircraft seating arrangement particularly for first class or business class seating. The seat disclosed in this International application is intended to fold from a position where a passenger can be seated, to a position where the seat becomes a bed.

The contents of the above International application are incorporated into this specification by this reference.

SUMMARY OF THE INVENTION

The object of the invention is to improve the seat so a longer bed can be provided by each seat whilst still maintaining or reducing seat pitch.

The invention provides a seat for an aircraft cabin, comprising:
  a backrest, having a front surface for supporting a passenger in a seating position when the backrest is in an upright position, and having a rear surface;
  a seat base upon which a passenger is seatable;
  a rear seat section behind the backrest when the backrest is in the upright position, the rear seat section having an open space which has a base, and a footwell closed to the open space beside the open space;
  a fixed side ottoman located beside the seat portion and extending in front of the seat portion, the side ottoman having a front portion, the front portion of the side ottoman being locatable within the footwell of another said seat in front of the said seat;
  the backrest being pivotally mounted for movement from the upright position to a flat position so the base of the open space, the rear surface of the backrest when in the flat position and the side ottoman form a bed configuration; and
  the base, the rear surface of the backrest and the front portion of the ottoman form a substantially flat surface when the seat is in the bed configuration.

Thus, according to the invention when two such seats are located one in front of the other the front portion of the ottoman of the rear seat is locatable in the footwell of the front seat. This enables the actual length of the bed to increase compared to that of the abovementioned International application. Further still, because there is some overlap of the seat with the front portion locating in the footwell, although the length of the bedding is increased, the amount of space taken up by the seats can be the same pitch or reduced pitch compared to those in the above International application.

Preferably the backrest has an extension piece pivotally mounted to the backrest for pivotal movement when the backrest is in the flat position to fill a space between the rear of the backrest and the front portion of the ottoman, the extension piece forming part of the substantially flat surface.

Preferably the extension piece folds flat against the rear surface of the backrest when the backrest is in an upright position.

Preferably the seat has a shell having sides and a rear panel, the open space being defined by one of the sides and the footwell, the footwell being formed partly in the rear panel as a box section extending forwardly of the rear panel.

Preferably the sides have first rear sections and second front sections, the rear sections being higher than the front sections, and the open space being defined between one of the rear sections and the footwell.

Preferably the footwell has a front wall and the backrest when in the upright position is adjacent to the front wall.

Preferably the footwell has a second part outside one of the sides, the second part being in line with the side ottoman.

Preferably the side ottoman has a shelf adjacent the said one of the sides.

The seat when in the bed configuration may provide a bed which is substantially horizontal or slightly upwardly inclined from the front portion of the side ottoman to the base of the open space.

The invention also provides an aircraft cabin having at least two seats arranged one in front of the other;
  each of said seats having;
    (a) a backrest having a front surface for supporting a passenger in a seating position when the backrest is in an upright position, and having a rear surface;
    (b) a seat base upon which a passenger is seatable;
    (c) a rear seat section behind the backrest when the backrest is in an upright position, the rear seat section having an open space which has a base, and a footwell closed to the open space beside the open space;
    (d) a fixed side ottoman located beside the seat portion and extending in front of the seat portion, the side ottoman having a front portion; and wherein
  the backrest is pivotally mounted for movement from the upright position to a flat position so the base of the open space, the rear surface of the backrest when in the flat position and the side ottoman form a bed configuration;
  the base, the rear surface of the backrest and the front portion of the ottoman form a substantially flat surface when the seat is in the bed configuration;
  the front portion of the ottoman of a rear seat of the two seats extending into the footwell of a front seat of the two seats; and
  wherein when the rear seat is in the bed configuration a passenger can lie transverse with respect to a central axis of the aircraft with the passenger's head resting on the base of the open space of the rear seat and the passenger's feet located in the footwell of the front seat on the front portion of the side ottoman of the rear seat.

Preferably the backrest has an extension piece pivotally mounted to the backrest for peripheral movement when the backrest is in the flat position to fill a space between the rear of the backrest and the front portion of the ottoman, the extension piece forming part of the substantially flat surface.

Preferably the extension piece folds flat against the rear surface of the backrest when the backrest is in an upright position.

Preferably the seat has a shell having sides and a rear panel, the open space being defined by one of the sides and the footwell, the footwell being formed partly in the rear panel as a box section extending forwardly of the rear panel.

Preferably the sides have first rear sections and second front sections, the rear sections being higher than the front sections, and the open space being defined between one of the rear sections and the footwell.

Preferably the footwell has a front wall and the backrest when in the upright position is adjacent to the front wall.

Preferably the footwell has a second part outside one of the sides, the second part being in line with the side ottoman.

Preferably the side ottoman has a shelf adjacent the said one of the sides.

BRIEF DESCRIPTION OF THE DRAWINGS

A preferred embodiment of the invention will be described, by way of example, with reference to the accompanying drawings in which.

DETAILED DESCRIPTION OF THE DRAWINGS

Figure 1:
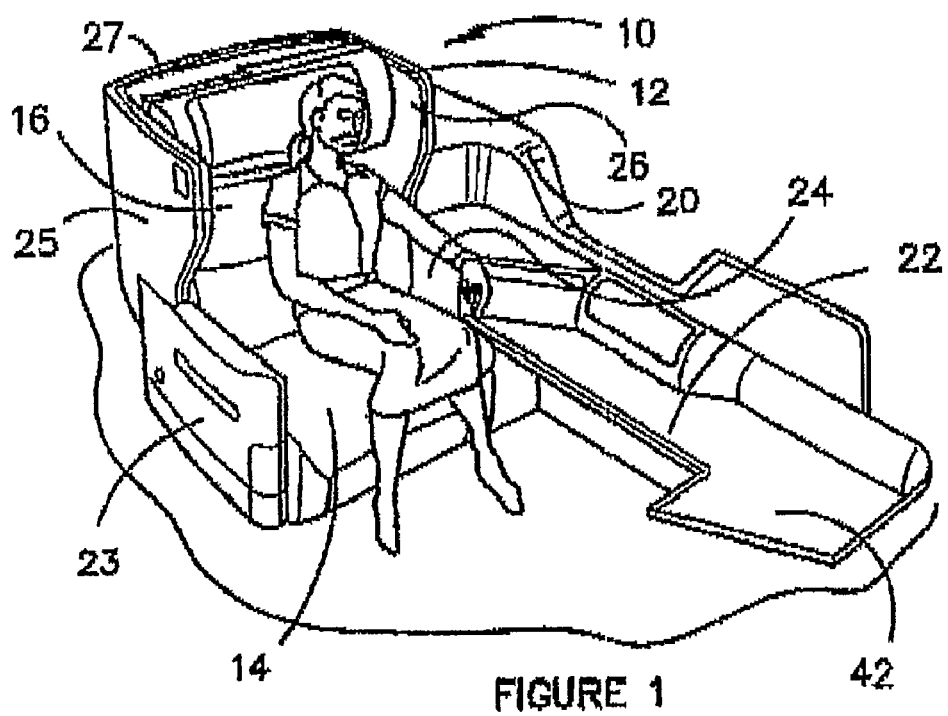
FIG. 1 is a view of a seat according to the preferred embodiment in a seated position with the seat in an upright position.

FIG. 1 is a view showing a seat 10 in an upright position with a passenger seated in the seat 10.

Figure 2:
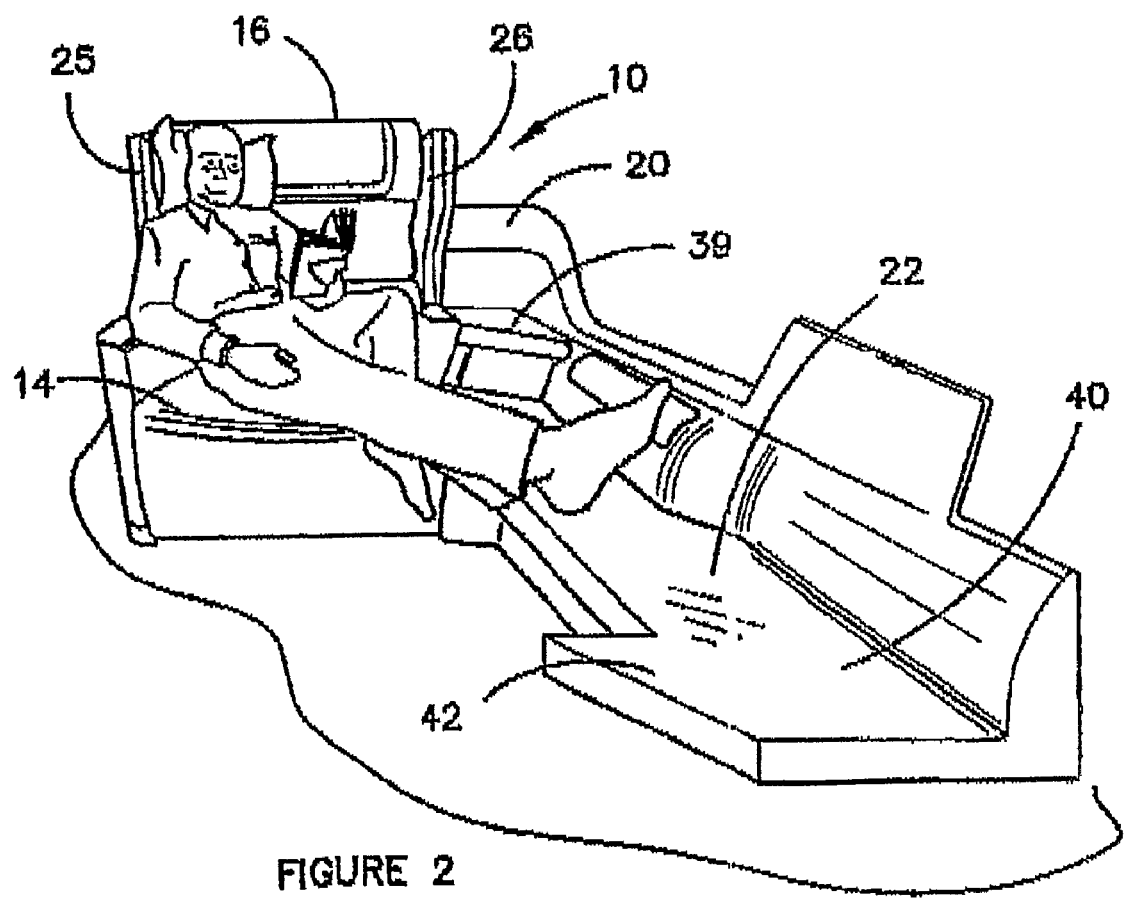
FIG. 2 is a view of the seat of FIG. 1 but showing a passenger reclined on the seat whilst the seat is in the upright position.

FIG. 2 is a view of the same seat 10 shown in FIG. 1 with one leg of the passenger resting on a side ottoman. In an aircraft cabin a number of these seats are arranged one in front of another and are fixed to suitable supports such as rails or the like (not shown) to secure the seats in place.

As shown in FIGS. 1 and 2 the seat has a shell 12 formed from any suitable rigid material such as aluminium, rigid plastic material or the like. The shell 12 supports a seat base 14 and the backrest 16.

The shell 12 has a side shell 20 which supports a side ottoman 22. The side shell 20 typically extends adjacent the side wall of the aircraft cabin.

The shell 12 has first and second front side portions 23 and 24 and first and second rear side portions 25 and 26. The rear side portions 25 and 26 are higher than the front side portions 23 and 24. The shell 12 also has a rear panel 27.

The seat 10 will be provided with a safety belt as is conventional, which is not shown in the drawings. A separate set of safety belts can be provided for the seat when in the bed configuration.

Figure 3:
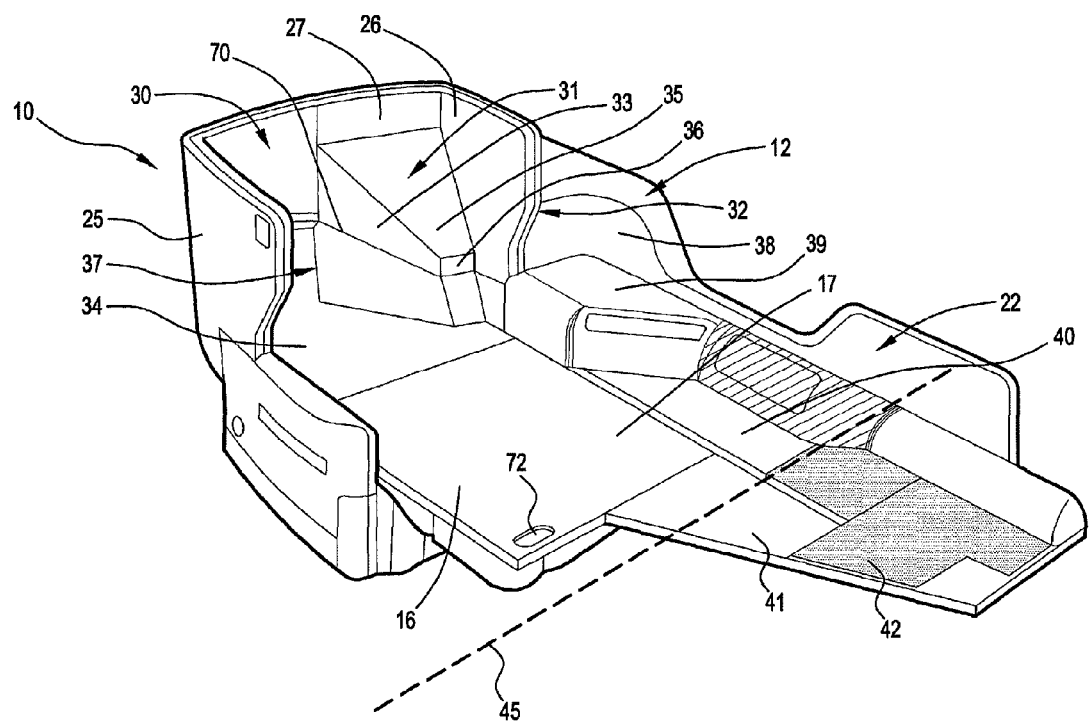
FIG. 3 is a view of the seat of FIGS. 1 and 2 in a bed configuration.

FIG. 3 is a view of the seat 10 in a bed configuration. In the configuration shown in FIG. 3 the backrest 16 has been pivoted down to a flat position so that rear surface 17 is uppermost. Movement of the backrest to the position shown in FIG. 3 exposes a rear seat portion 30 located behind the backrest 16 when in the upright position, and which is generally defined by the back panel 27 and the rear side portions 25 and 26. The rear seat section 30 has an open space 37 which has a base 34, and the first part 31 of a footwell cavity 32. The footwell part 31 is a box section formed from an upright panel 33, an inclined top panel 35, and a small front surface 36. A second part 38 of the footwell 32 is an extension of the part 31 defined within the shell 12 beside rear side portion 26.

The side ottoman 22 has a shelf 39 which can be used both when the seat is in the seating configuration shown in FIGS. 1 and 2 and the bed configuration shown in FIG. 3. The ottoman 22 has an ottoman surface 40 and a front portion 42 which is a continuation of the surface 40. The front portion 42 is located in front of the backrest 16 when the backrest in the position shown in FIG. 3.

An extension piece 41 is pivotally connected to the backrest 16 and can pivot from a position overlapping the backrest 16 to the position shown in FIG. 3 to occupy the space between the rear surface 17 of the backrest and the front portion 42 of the ottoman. The line 45 shown in FIG. 3 generally shows the position of the rear panel 27' (FIG. 6) of another seat 10' (FIG. 6) in front of the seat shown in FIG. 3.

Figure 4:
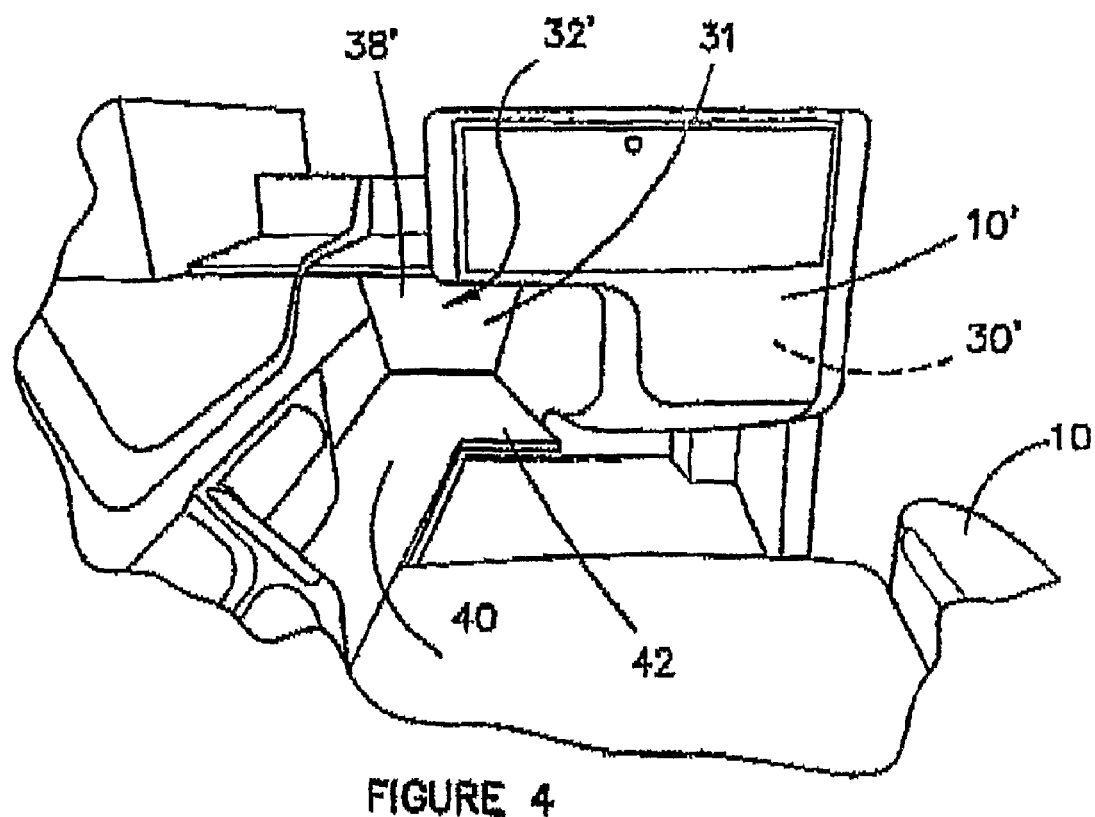
FIG. 4 is a rear view of a seat according to the preferred embodiment.

The front portion of the ottoman 42 extends into the footwell 32' of the seat 10' in front of the seat 10 shown in FIG. 3 as is best shown in FIG. 4.

In FIG. 4 the front seat 10' located in front of the seat 10 shows the cavity which forms the footwell 32' into which the front portion 42 extends.

When the seat is in the bed configuration shown in FIG. 3 the base 34 of the open space 37, the rear surface 17 of the backrest 16, the extension piece 41 and the front portion 42 of the ottoman 22 form a flat surface which forms a bed.

The preferred embodiment of the invention includes the side ottoman 22 as part of the available bed surface when the seat is in the bed configuration. The height of the ottoman 22 is designed to match the height of the other bed components (i.e. rear surface 17) when the seat is in the bed configuration.

The base 34, rear surface 17 and extension piece 42 can be covered by a comfortable foam material or the like as is the ottoman surface 40 and front portion 42.

Figure 5:
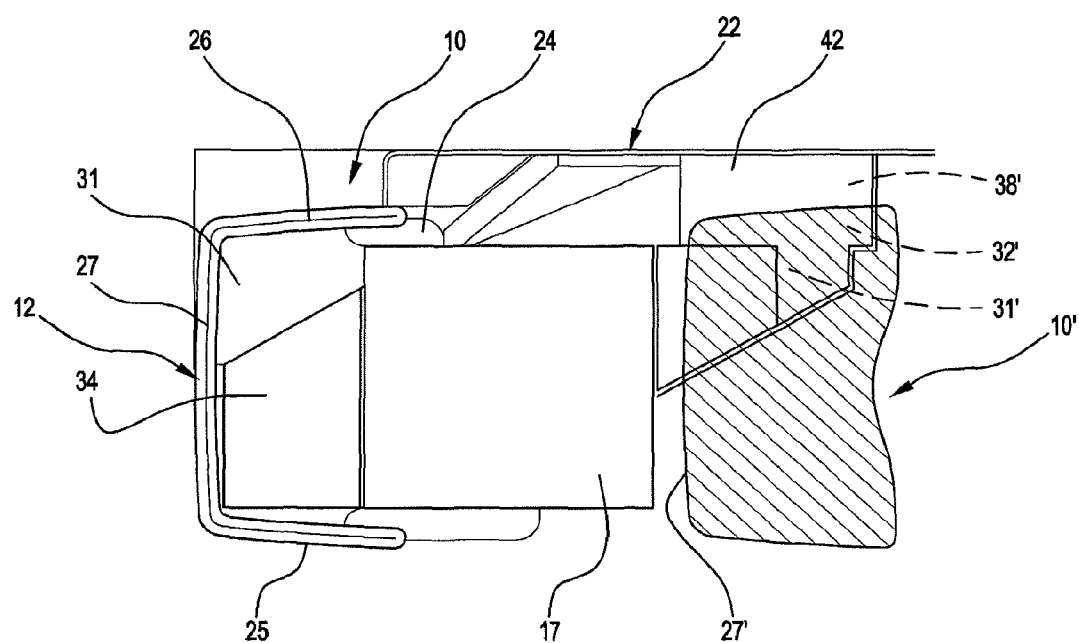
FIG. 5 is a plan view through two seats.

FIG. 5 is a plan view of two seats 10 and 10' with the seat 10 in the bed configuration. As is apparent from FIG. 5 a person's head can locate in the open space 37 resting on the base 34 (or on a pillow or other comfortable head support located on the base 34) and the person can lay diagonally across the rear surface 17 of the backrest 16 with the person's feet locating on the front portion 42 of the ottoman 22 within the footwell 32' of the front seat 10'.

Figure 6:
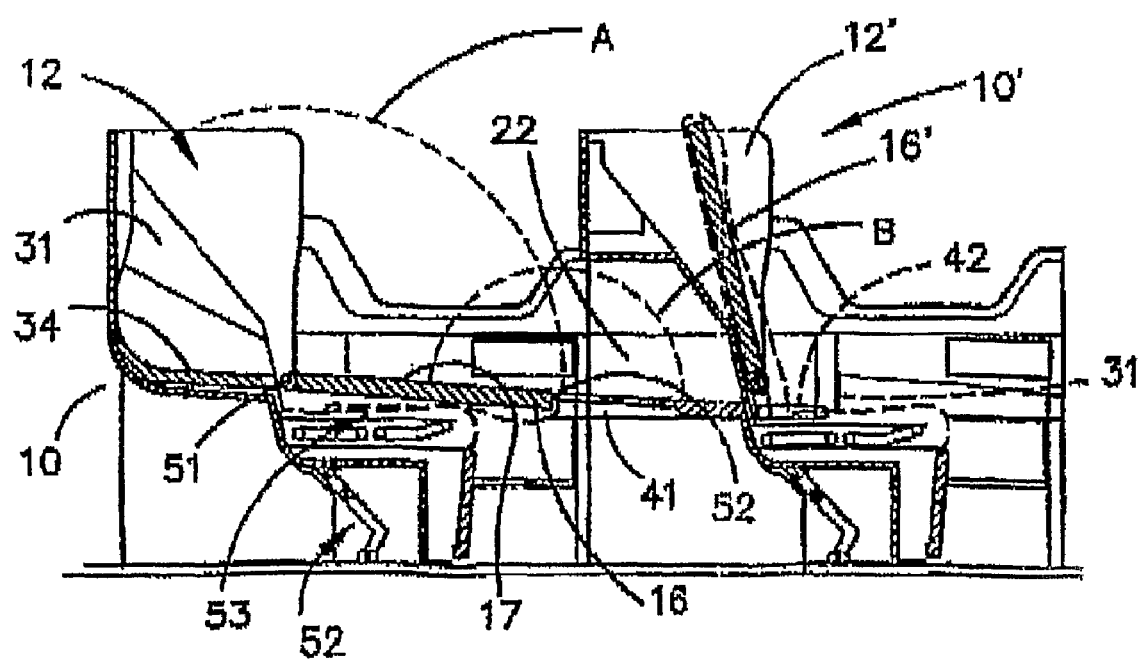
FIG. 6 is a cross-section through the seats of FIG. 5.

A side view of the two seats is shown in FIG. 6. In FIG. 6 a pivotal coupling 51 can be seen which enables the backrest 16 to move from the upright position to the flat position as shown by dotted line A, and also the pivotal coupling 52 which enables the extension piece 41 to move from the folded position against the rear surface 17 of the backrest 16 into positions shown in FIG. 6 as illustrated by the dotted line B in FIG. 6. It is also apparent from FIG. 6 that the front portion 42 of the side ottoman 22 extends into the footwell 31' of the front seat 10'. FIG. 6 also shows the supporting structure 52 which supports the seat in the aircraft cabin. The supporting structure 52 is conventional and therefore will not be described in any further detail. FIG. 6 also shows seat mechanism 53 for enabling the seat to be adjusted between a fully upright position shown in FIGS. 1 and 2 and into a reclined position in which the seat base 14 moves slightly forward causing the backrest 16 to take up a more inclined upright position. Again the mechanism 53 is conventional and therefore will not be described in further detail.

Figure 7:
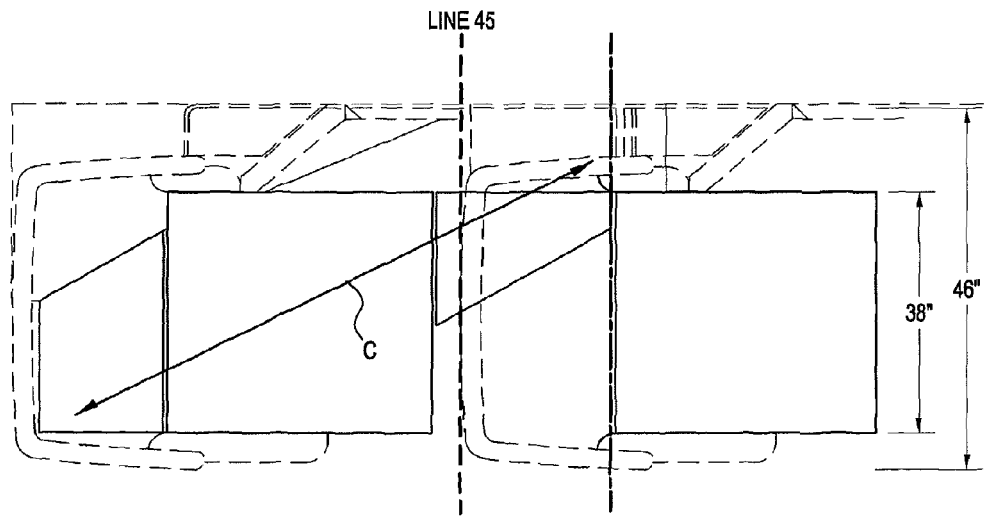
FIG. 7 is an illustration showing the configuration of the previously mentioned International application.

FIG. 7 is a plan view of two seats according to the above-mentioned International application with the rear seat in the bed configuration. As can be seen from FIG. 7 the width of the actual seat portion itself is 38 inches with the overall width of the seating configuration being 46 inches. The length of the bed is generally illustrated by double-headed arrow C in FIG. 7.

Figure 8:
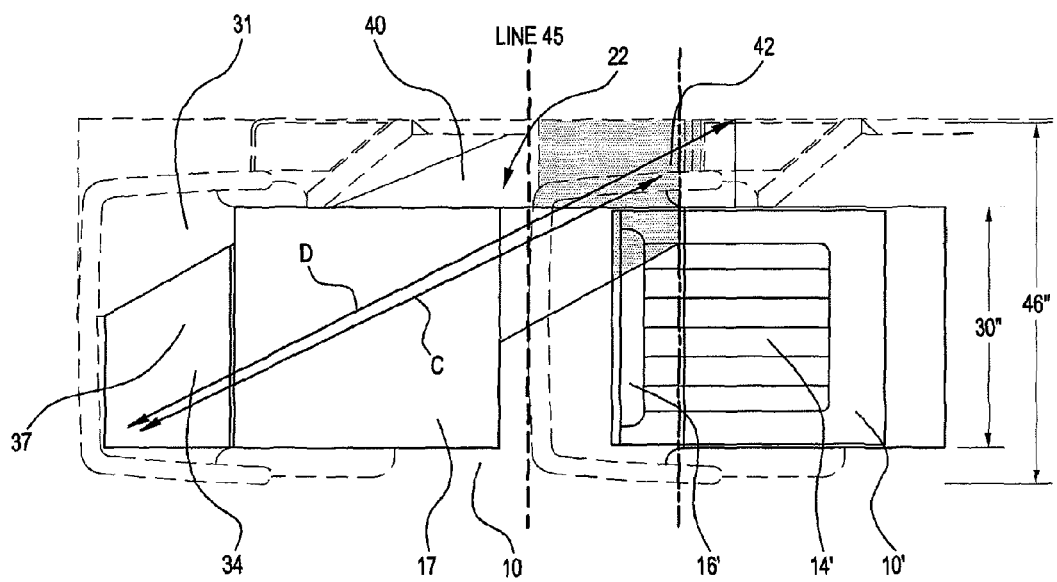
FIG. 8 is an illustration of the preferred embodiment of the invention showing the difference between the preferred embodiment and the seat of FIG. 7.

FIG. 8 shows the rear seat 10 of the preferred embodiment of the invention in the bed configuration, with the front seat 10' in the normal upright configuration. As is apparent from FIG. 8 the width of the seat is reduced to about 30 inches whilst the overall width of the configuration remains the same. However, the length of the bed is increased as shown by arrow D. Arrow C is also shown in FIG. 8 for comparison purposes. Thus, the bed configuration is larger without sacrificing the overall width of the seat configuration shown in FIGS. 7 and 8 or the overall length of the seat configuration. Thus, a larger bed length is achieved for the same pitch of seating within the aircraft cabin.

The rear of the panel 27 may be provided with a television screen for the person behind that seat or with other items such as a foldable shelf etc.

In the preferred embodiment of the invention the shell 12 can be formed in a number of parts such as a first part containing the front side portions 23 and 24 and the lower part of the footwell part 31 and the rear side portions 25 and 26. The upper part of the rear panel 30 together with the upper part of the footwell 31 can be formed as a second part and joined to the first part along, for example, line 70 shown in FIG. 3.

When the seat 16 is in the upright position the rear of the seat 17 can rest against the front wall 36 for support. The seat may also lock in the upright position as is conventional until it is adjusted to move into the flat position shown in FIG. 3 by means of a release mechanism 72 shown in FIG. 3 which can be maneuvered to allow the seat to fold into the flat position shown in FIG. 3 and used as a handle to return the seat to the upright position.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Since modifications within the spirit and scope of the invention may readily be effected by persons skilled within the art, it is to be understood that this invention is not limited to the particular embodiment described by way of example hereinabove.

The invention claimed is:

1. A seat for an aircraft cabin, comprising:
   a backrest, having a front surface for supporting a passenger in a seating position when the backrest is in an upright position, and having a rear surface;
   a seat base upon which a passenger is seatable;
   a rear seat section behind the backrest when the backrest is in the upright position, the rear seat section having an open space which has a base, and a footwell closed to the open space beside the open space;
   a fixed side ottoman located beside the seat base and extending in front of the seat base, the side ottoman having a front portion, the front portion of the side ottoman being locatable within a front footwell of another said seat in front of said seat;
   the backrest being pivotally mounted for movement from the upright position to a flat position so the base of the open space, the rear surface of the backrest when in the flat position and the side ottoman form a bed configuration; and
   the base, the rear surface of the backrest and the front portion of the ottoman form a substantially flat surface when the seat is in the bed configuration.

2. The seat of claim 1, wherein the backrest has an extension piece pivotally mounted to the backrest for pivotal movement when the backrest is in the flat position to fill a space between a rear of the backrest and the front portion of the ottoman, the extension piece forming part of the substantially flat surface.

3. The seat of claim 2, wherein the extension piece folds flat against the rear surface of the backrest when the backrest is in the upright position.

4. The seat of claim 1, wherein the seat has a shell having side portions and a rear panel, the open space being defined by one of the side portions and the footwell, the footwell being formed partly in the rear panel as a box section extending forwardly of the rear panel.

5. The seat of claim 4, wherein the side portions each comprise a rear portion and a front portion, the rear portions being higher than the front portions, and the open space being defined between one of the rear portions and the footwell.

6. The seat of claim 5, wherein the footwell has a front wall and the backrest when in the upright position is adjacent the front wall.

7. The seat of claim 4, wherein the footwell has a second part outside one of the side portions, the second part being in line with the side ottoman.

8. The seat of claim 1, wherein the side ottoman has a shelf adjacent the said one of the side portions.

9. An aircraft cabin having at least two seats arranged one in front of the other;
   each of said seats having;
   (a) a backrest having a front surface for supporting a passenger in a seating position when the backrest is in an upright position, and having a rear surface;
   (b) a seat base upon which a passenger is seatable;
   (c) a rear seat section behind the backrest when the backrest is in an upright position, the rear seat section having an open space which has a base, and a footwell closed to the open space beside the open space;
   (d) a fixed side ottoman located beside the seat base and extending in front of the seat base, the side ottoman having a front portion; and wherein
   the backrest is pivotally mounted for movement from the upright position to a flat position so the base of the open space, the rear surface of the backrest when in the flat position and the side ottoman form a bed configuration;
   the base, the rear surface of the backrest and the front portion of the ottoman form a substantially flat surface when the seat is in the bed configuration;
   a front portion of the ottoman of a rear seat of the two seats extending into a front footwell of a front seat of the two seats; and
   wherein when the rear seat is in the bed configuration a passenger can lie transverse with respect to a central axis of the aircraft with the passenger's head resting on the base of the open space of the rear seat and the passenger's feet located in the front footwell of the front seat on the front portion of the side ottoman of the rear seat.

10. The cabin of claim 9, wherein the backrest has an extension piece pivotally mounted to the backrest for pivotal movement when the backrest is in the flat position to fill a space between a rear of the backrest and the front portion of the ottoman, the extension piece forming part of the substantially flat surface.

11. The cabin of claim 10, wherein the extension piece folds flat against the rear surface of the backrest when the backrest is in the upright position.

12. The cabin of claim 11, wherein the footwell has a second part outside one of the side portions, the second part being in line with the side ottoman.

13. The cabin of claim 9, wherein the seat has a shell having side portions and a rear panel, the open space being defined by one of the side portions and the footwell, the footwell being formed partly in the rear panel as a box section extending forwardly of the rear panel.

14. The cabin of claim 13, wherein the side portions each comprise a rear portion and a front portion, the rear portions being higher than the front portions, and the open space being defined between one of the rear portions and the footwell.

15. The cabin of claim 13, wherein the side ottoman has a shelf adjacent said one of the side portions.

16. The cabin of claim 9, wherein the footwell has a front wall and the backrest when in the upright position is adjacent the front wall.

* * * * *